United States Patent
Fujishima et al.

(10) Patent No.: US 8,517,080 B2
(45) Date of Patent: Aug. 27, 2013

(54) LAMINATING DEVICE AND THERMAL PRESSURE BONDING AND CONVEYING DEVICE USED IN LAMINATING DEVICE

(75) Inventors: Nobuo Fujishima, Yamato (JP); Yoshio Masuko, Fujioka (JP); Yasuyuki Mitomo, Fujioka (JP)

(73) Assignee: Sakae Co., Ltd., Tokyo (JP)

( * ) Notice: Subject to any disclaimer, the term of this patent is extended or adjusted under 35 U.S.C. 154(b) by 252 days.

(21) Appl. No.: 12/869,247

(22) Filed: Aug. 26, 2010

(65) Prior Publication Data

US 2012/0048470 A1      Mar. 1, 2012

(51) Int. Cl.
*B32B 37/00*      (2006.01)

(52) U.S. Cl.
USPC .................. 156/583.5; 156/555; 156/582

(58) Field of Classification Search
USPC ........... 156/359, 555, 580, 582, 583.1, 583.5; 492/46
See application file for complete search history.

(56) References Cited

U.S. PATENT DOCUMENTS

| | | | |
|---|---|---|---|
| 5,885,410 A * | 3/1999 | Berkan ..................... | 156/582 |
| 7,427,727 B2 * | 9/2008 | Koide et al. ................ | 219/216 |
| 2009/0003902 A1 * | 1/2009 | Sakakibara et al. ......... | 399/331 |

FOREIGN PATENT DOCUMENTS

| | | |
|---|---|---|
| JP | 2901228 B2 | 6/1999 |
| JP | 3779014 B2 | 5/2006 |

* cited by examiner

*Primary Examiner* — James Sells
(74) *Attorney, Agent, or Firm* — Birch, Stewart, Kolasch & Birch, LLP

(57) ABSTRACT

A laminating device is provided that can increase the rate of rise of a laminating temperature and keep the laminating temperature stable without using a temperature control system for a heat source. The laminating device for stacking and bonding a laminate film 11 coated with a hot-melt adhesive and a sheet 12 has a thermal pressure bonding and conveying device 10 that thermally pressure-bonds the laminate film 11 and the sheet 12 while stacking and conveying them. The thermal pressure bonding and conveying device 10 comprises: a pair of bond-and-convey members 1, at least one of them formed as a hollow roll, to grip and convey the laminate film 11 and the sheet 12; a platelike heating member 2 having a platelike PTC thermistor and placed in at least one of the paired bond-and-convey members which is formed as a hollow roll; and a heat transfer frame 3 placed inside and in contact with the hollow roll-shaped bond-and-convey member 1, holding the platelike heating member 2 therein and being able to transfer heat from the platelike heating member 2 to the hollow roll-shaped bond-and-convey member 1.

11 Claims, 13 Drawing Sheets

LAMINATING DEVICE AND THERMAL PRESSURE BONDING AND CONVEYING DEVICE USED IN LAMINATING DEVICE

BACKGROUND OF THE INVENTION

1. Field of the Invention

The present invention relates to a laminating device to stack and bond together a laminate film applied with a hot-melt adhesive and a sheet, and more particularly to improvements in a laminating device that thermally pressure-bonds a laminate film and a sheet together as they are conveyed and in a thermal pressure bonding and conveying device used in the laminating device.

2. Background Art

Conventional laminating devices are found, for example, in Japanese Patent No. 3779014 (Embodiment of Invention, FIG. 4 to FIG. 7) and Japanese Patent No. 2901228 (Embodiment, FIG. 3).

Japanese Patent No. 3779014 discloses a laminating device which has a heating source to heat a laminate film, a pair of pressure-bonding rollers to bond the heated laminate film and a sheet material together and sensors to detect a temperature of the heating source and a temperature of the laminate film, and which controls the temperature of the heating source based on the sensor output.

Japanese Patent No. 2901228 discloses another laminating device in which a sheet material and a laminate film coated with a hot-melt adhesive are stacked together and inserted between a pair of rollers, at least one of which has a heating means installed therein, to heat and bond them together in one integral form, and in which an electric current to the heating means is cut off upon detecting an abnormal heating of the heating rollers by a heat detection means.

These devices, however, have drawbacks. In Japanese Patent No. 3779014, because the heating source such as an infrared heater and a planar heating source is used, a temperature control system (sensors and a temperature controller) for the heating source is required.

Also in Japanese Patent No. 2901228, a heating means such as a far-infrared tube heater is used, making it necessary to use a temperature control system. In addition, there is a possibility of the heating means going out of control during the heating operation. This requires some provisions to detect the abnormality.

The present invention has been accomplished to overcome the aforementioned problems. For this purpose, this invention aims at achieving a technology that allows for increasing a speed of a laminating temperature rise and maintaining the laminating temperature in a stable condition.

SUMMARY OF THE INVENTION

The invention claimed in claim 1 concerns a laminating device for stacking and bonding a laminate film coated with a hot-melt adhesive and a sheet, which comprises: a thermal pressure bonding and conveying device to thermally pressure-bond at least the laminate film and the sheet while stacking and conveying them; wherein the thermal pressure bonding and conveying device comprises: a pair of bond-and-convey members, at least one of them formed as a hollow roll, to grip and convey the laminate film and the sheet; a platelike heating member having a platelike PTC thermistor and placed in at least one of the paired bond-and-convey members which is formed as a hollow roll; and a heat transfer frame placed inside and in contact with the hollow roll-shaped bond-and-convey member, holding the platelike heating member therein and being able to transfer heat from the platelike heating member to the hollow roll-shaped bond-and-convey member.

The invention claimed in claim 2 concerns a laminating device according to claim 1, wherein the heat transfer frame comprises: a holding cylinder having a cylindrical space almost rectangular in cross section in which to accommodate the platelike heating member, the holding cylinder being so constructed that at least circumferential wall portions thereof facing front and back surfaces of the platelike heating member can resiliently deform; and heat transfer arms resiliently deformably protruding outwardly from parts of the resiliently deformable circumferential wall portions of the holding cylinder, the heat transfer arms being elastically deformed and placed in contact with an inner surface of the hollow roll-shaped bond-and-convey member; wherein, as a result of the elastic deformation of the heat transfer arms, the elastically deformable circumferential wall portions of the holding cylinder are brought into hermetic contact with the front and back surfaces of the platelike heating member.

The invention claimed in claim 3 concerns a laminating device according to claim 2, wherein the heat transfer arms of the heat transfer frame are provided at corners of the almost rectangular cross section of the holding cylinder and arranged line-symmetrically with respect to a center line extending widthwise of the rectangular cross section of the holding cylinder.

The invention claimed in claim 4 concerns a laminating device according to claim 2, wherein the heat transfer arms are arranged line-symmetrically or point-symmetrically with respect to the holding cylinder positioned between them.

The invention claimed in claim 5 concerns a laminating device according to claim 2, wherein the holding cylinder of the heat transfer frame has its side wall portions, opposing each other widthwise of the rectangular cross section, elastically deform as the heat transfer arms are elastically deformed; wherein, before the heat transfer arms are deformed and placed in contact with the inner surface of the hollow roll-shaped bond-and-convey member, the side wall portions of the holding cylinder are in contact with widthwise-opposing side portions of the platelike heating member.

The invention claimed in claim 6 concerns a laminating device according to claim 1, wherein the thermal pressure bonding and conveying device has both of the paired bond-and-convey members formed as hollow rolls; wherein the platelike heating member is held in at least one of the bond-and-convey members through the heat transfer frame.

The invention claimed in claim 7 concerns a laminating device according to claim 1, further comprising: in addition to the thermal pressure bonding and conveying device claimed in claim 1, a pair of conveying members installed downstream of the thermal pressure bonding and conveying device to pull and convey the sheet laminated with the laminate film that has passed the thermal pressure bonding and conveying device.

The invention claimed in claim 8 concerns a laminating device according to claim 1, wherein the thermal pressure bonding and conveying device comprises: a pair of upstream bond-and-convey members, both formed like rolls and at least one of them formed as a hollow roll, to grip and convey the laminate film and the sheet; a pair of downstream bond-and-convey members, both formed like rolls, installed downstream of the upstream bond-and-convey members and adapted to grip and convey the laminate film and the sheet; and belt members each stretched between the paired upstream bond-and-convey members and the paired downstream bond-and-convey members; wherein the platelike heating member is held, through the heat transfer frame, in at least one of the upstream bond-and-convey members which is formed as the hollow roll.

The invention claimed in claim 9 concerns a thermal pressure bonding and conveying device used in a laminating device to bond at least a laminate film coated with a hot-melt adhesive and a sheet under pressure and heat by stacking and conveying them, the thermal pressure bonding and conveying device comprising: a pair of bond-and-convey members, at least one of them formed as a hollow roll and both adapted to grip and convey the laminate film and the sheet in a predetermined nip area; a platelike heating member having a platelike PTC thermistor and placed in at least one of the paired bond-and-convey members which is formed as a hollow roll; and a heat transfer frame placed inside and in contact with the hollow roll-shaped bond-and-convey member, holding the platelike heating member therein and being able to transfer heat from the platelike heating member to the hollow roll-shaped bond-and-convey member.

Advantages of the Invention

According to the invention of claim 1, the platelike heating member with PTC thermistors is used as a heat source and held inside the hollow portion of the bond-and-convey member through the heat transfer frame to transfer heat from the heat source to the bond-and-convey member. This construction allows the rate of rise of the laminating temperature to be increased and the laminating temperature to be kept stable without using a temperature control system for the heat source.

That is, this construction produces the following basically advantageous effects.

Thanks to the temperature self-controlling function of the platelike heating member with PTC thermistors, the target laminating temperature can be maintained without causing an overheat, without having to use a temperature control system (temperature sensors, temperature adjuster, temperature controller). Further, when compared with an intermittent on-off control by a temperature adjuster, the temperature self-control of this invention is based on continuous changes in resistance, minimizing fluctuations in temperature.

Further, because of the temperature characteristic of the platelike heating member with PTC thermistors, the rate of rise of the laminating temperature is fast and the laminating temperature is prevented from exceeding the set temperature. This contributes to an energy conservation and also eliminates the need to take preventive measures against abnormalities.

Furthermore, since the platelike PTC thermistors produce heat from their entire surfaces, there are few temperature variations with no local temperature changes, realizing a uniform heat distribution in the thermal pressure bonding and conveying device.

According to the invention of claim 2, the platelike heating member with PTC thermistors can be held firmly and the heat produced by the platelike heating member can easily be transferred to the hollow roll-shaped bond-and-convey member.

According to the invention of claim 3, the heat from either the front or back surface of the platelike heating member can be transmitted almost uniformly to the hollow roll-shaped bond-and-convey member.

According to the invention of claim 4, the heat from both the front and back surfaces of the platelike heating member can be transmitted almost uniformly to the hollow roll-shaped bond-and-convey member.

According to the invention of claim 5, both of the widthwise-opposing side wall portions of the holding cylinder, which has an almost rectangular cross section, elastically deform as the heat transfer arms are elastically deformed. Before the heat transfer frame is inserted into the bond-and-convey member, both of the side wall portions of the holding cylinder are in contact with the widthwise-opposing side portions of the platelike heating member, causing the platelike heating member in the hollow space of the bond-and-convey member to be positioned almost symmetrical with respect to the center of the bond-and-convey member. As a result, the platelike heating member can be kept at an almost fixed position in the bond-and-convey member.

According to the invention of claim 6, a typical construction of the thermal pressure bonding and conveying device can easily be implemented.

According to the invention of claim 7, since the sheet, immediately after being laminated by the thermal pressure bonding and conveying device, is pulled and conveyed by the conveying member, the laminated sheet can be prevented from getting corrugated or kinked.

According to the invention of claim 8, the laminated sheet can be transferred stably.

According to the invention of claim 9, it is possible to construct with ease a laminating device which has a high rate of rise of the laminating temperature and can keep the laminating temperature stable, without having to use a temperature control system for the heat source.

DESCRIPTION OF THE EMBODIMENTS

Overview of Embodiments

Figure 1:
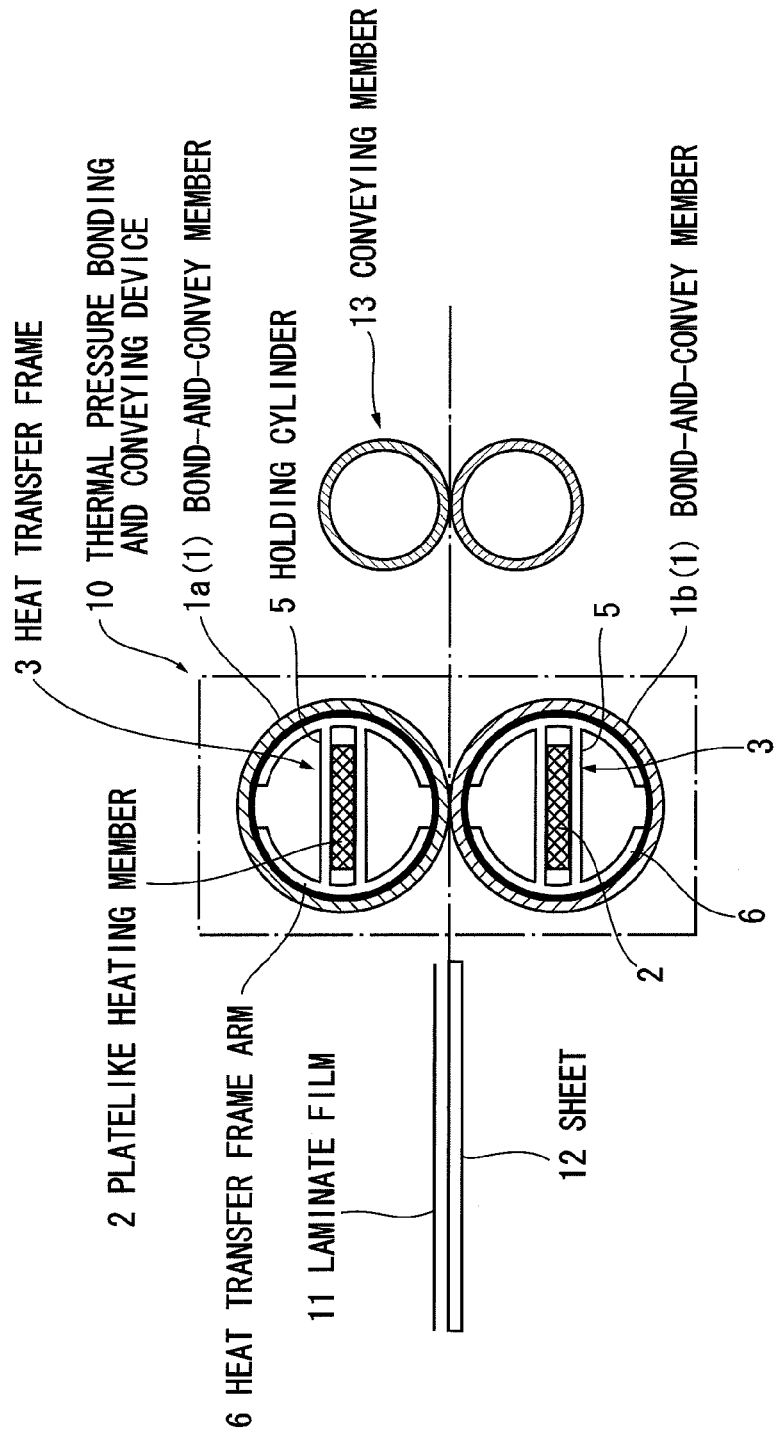
FIG. 1 is an explanatory diagram showing an outline of one embodiment of a laminating device applying the present invention.

FIG. 1 shows an outline of one embodiment of a laminating device applying the present invention.

In the figure, the laminating device is designed to stack and bond together a laminate film 11 coated with a hot-melt adhesive and a sheet 12, and has at least a thermal pressure bonding and conveying device 10 that stacks and thermally pressure-bonds the laminate film 11 and the sheet 12 together as they are conveyed.

The thermal pressure bonding and conveying device 10 has a pair of bond-and-convey members 1 (e.g., 1a, 1b), at least one of them formed as a hollow roll and both adapted to grip and convey the laminate film 11 and the sheet 12; a platelike heating member 2 having a platelike PTC thermistor and placed in at least one of the paired bond-and-convey members 1 which is formed as a hollow roll (1a, 1b in this example); and a heat transfer frame 3 placed inside and in contact with the hollow roll-shaped bond-and-convey member 1 (1a, 1b in this example), holding the platelike heating member 2 therein and being able to transfer heat from the platelike heating member 2 to the hollow roll-shaped bond-and-convey member 1.

In such a technical means, the embodiment of this invention concerns a laminating device having at least the thermal pressure bonding and conveying device 10 and does not include a construction in which the bonding and conveying device and the heating device are provided separately (for example, an independent heating device is installed between a pair of inlet conveying members and a pair of outlet conveying members).

In this embodiment, the thermal pressure bonding and conveying device 10 needs only to have a pair of bond-and-convey members 1 (1a, 1b), at least one of them formed as a hollow roll. The paired bond-and-convey members 1 (1a, 1b) may be formed both as roll members. Or one of them may be formed as a hollow roll member and the other as a belt member pressed under pressure against the hollow roll member. Another construction may also be employed in which a plurality of pairs of roll-shaped bond-and-convey members 1 are arranged along the sheet conveying path, with belt members stretched between the two pairs of the bond-and-convey members 1, and in which at least one of the upstream roll-shaped bond-and-convey members 1 is formed hollow to accommodate the platelike heating member 2. Where the paired bond-and-convey members 1 are both hollow roll members, the embodiment of this invention also includes a construction in which the platelike heating member 2 and the heat transfer frame 3 are incorporated in only one of the hollow roll members.

Further, although the thermal pressure bonding and conveying device 10 needs only to have at least a pair of bond-and-convey members 1, with at least one of them incorporating the platelike heating member 2 and the heat transfer frame 3, it is a preferable option from the standpoint of, for example, increasing the lamination speed that the platelike heating member 2 and the heat transfer frame 3 may be assembled into a plurality of pairs of bond-and-convey members 1 so that the thermal pressure bonding operation for lamination can be executed in a plurality of stages.

As for the laminating device, it is of course possible to add other elements than the thermal pressure bonding and conveying device 10. For example, from the standpoint of preventing the laminated sheet 12 from getting corrugated or twisted, it is possible to provide, downstream of the thermal pressure bonding and conveying device 10, a pair of conveying members 13 to pull and convey the sheet 12 laminated with the laminate film 11 after the sheet has passed the thermal pressure bonding and conveying device 10. It is also possible to install a guide member for guiding the laminate film 11 and the sheet 12, upstream or downstream of the thermal pressure bonding and conveying device 10 and the paired conveying members 13.

The platelike heating member 2 may be of any desired type as long as it has platelike PTC thermistors.

In a widely used construction, the platelike heating member 2 has an appropriate number of relatively short PTC thermistors arrayed lengthwise according to the size of the sheet 12 and laminate film 11, although an elongate platelike PTC thermistor extending over the entire length of the platelike heating member may of course be used.

In a typical power supply configuration for the platelike heating member 2, the PTC thermistors are provided with electrodes at their front and back surfaces for supply of electricity, with an insulation cover wholly enclosing them to prevent possible leakage.

Further, the heat transfer frame 3 is required to have a function of holding the platelike heating member 2 and a function of transferring heat from the platelike heating member 2.

The heat transfer frame 3 is preferably formed of a metal with high heat transferability (e.g., aluminum). To secure a good platelike heating member holding function and a good heat transferability, it is desired that the heat transfer frame 3 be placed in hermetic contact with at least heating surfaces of the platelike heating member 2.

In its typical construction the heat transfer frame 3 comprises a holding cylinder 5 having a cylindrical space almost rectangular in cross section in which to accommodate the platelike heating member 2, the holding cylinder being so constructed that at least circumferential wall portions thereof facing front and back surfaces of the platelike heating member 2 can resiliently deform; and heat transfer arms 6 resiliently deformably protruding outwardly from parts of the resiliently deformable circumferential wall portions of the holding cylinder 5, the heat transfer arms 6 being elastically deformed and placed in contact with an inner surface of the hollow roll-shaped bond-and-convey member 1; wherein, as a result of the elastic deformation of the heat transfer arms 6, the elastically deformable circumferential wall portions of the holding cylinder 5 are brought into hermetic contact with the front and back surfaces of the platelike heating member 2.

In the heat transfer frame 3 of the above construction, it is preferred from the standpoint of making the heat transferability uniform that the heat transfer arms of the heat transfer frame be provided at corners of the almost rectangular cross section of the holding cylinder 5 and arranged line-symmetrically with respect to a center line extending widthwise of the rectangular cross section of the holding cylinder 5. In another preferred construction the heat transfer arms 6 may be arranged line-symmetrically or point-symmetrically with respect to the holding cylinder lying between them.

Further, from the standpoint of keeping the platelike heating member 2 in its place with high precision by the heat transfer frame 3, it is preferred that the heat transfer frame 3 be constructed such that the holding cylinder 5 of the heat transfer frame 3 has its side wall portions, opposing each other widthwise of the rectangular cross section, elastically deform as the heat transfer arms 6 are elastically deformed and that, before the heat transfer arms 6 are deformed and placed in contact with the inner surface of the hollow roll-shaped bond-and-convey member 1, the side wall portions of the holding cylinder 5 are in contact with widthwise-opposing side portions of the platelike heating member.

In this construction, as the heat transfer arms 6 are elastically deformed and placed in contact with the inner surface of the bond-and-convey member 1, the widthwise-opposing side wall portions of the holding cylinder 5 may remain in contact with the side portions of the platelike heating member 2 or part from them. However, from the standpoint of protecting the platelike heating member 2, the heat transfer frame 3 is preferably designed such that, as the heat transfer arms 6 are elastically deformed and placed in contact with the inner surface of the bond-and-convey member 1, the widthwise-opposing side wall portions of the holding cylinder 5 deform away from the side portions of the platelike heating member 2.

Embodiment 1

Laminating Device

Figure 2:
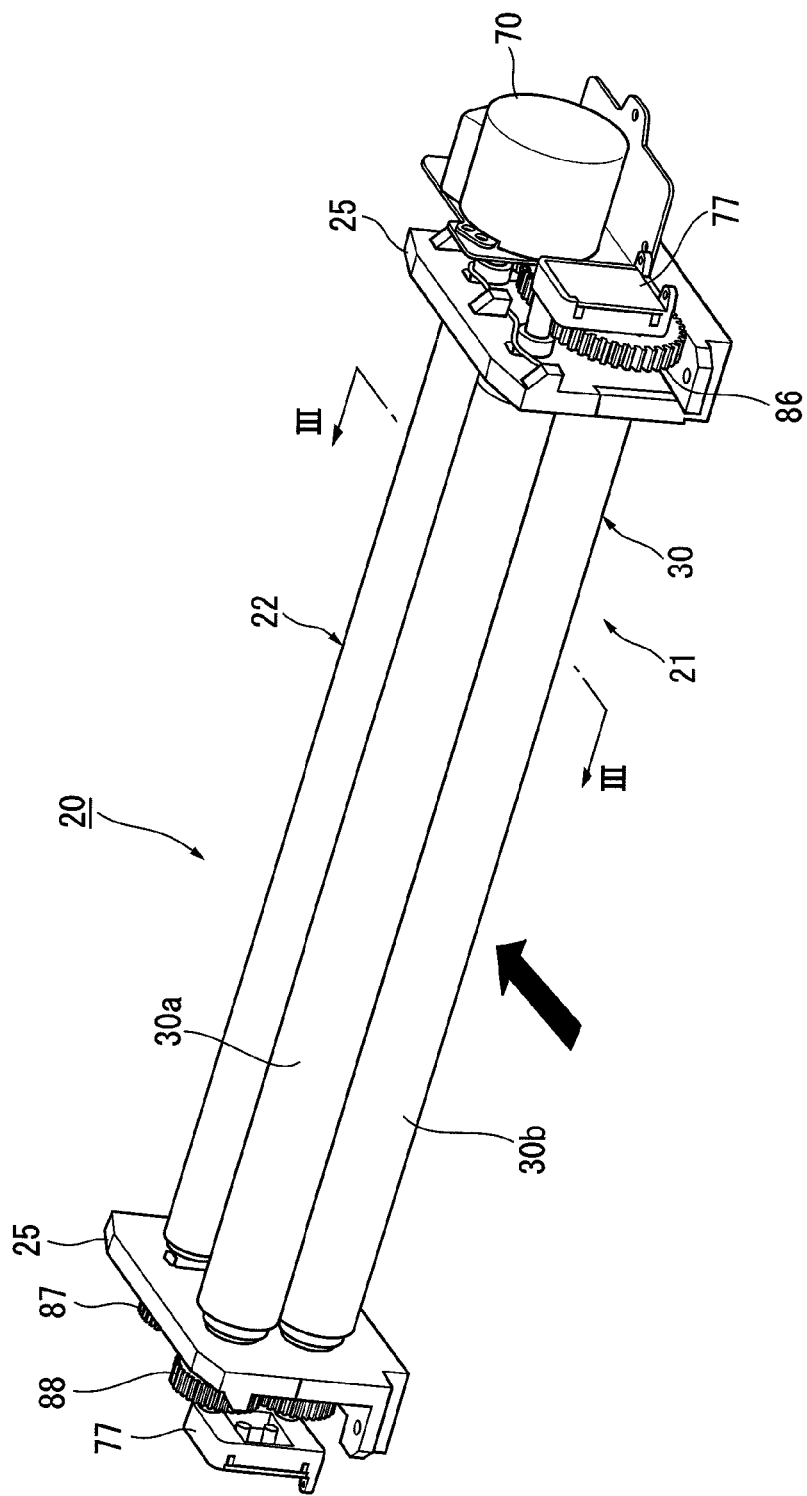
FIG. 2 is an explanatory diagram showing an essential construction of the laminating device according to embodiment 1.
Figure 3:
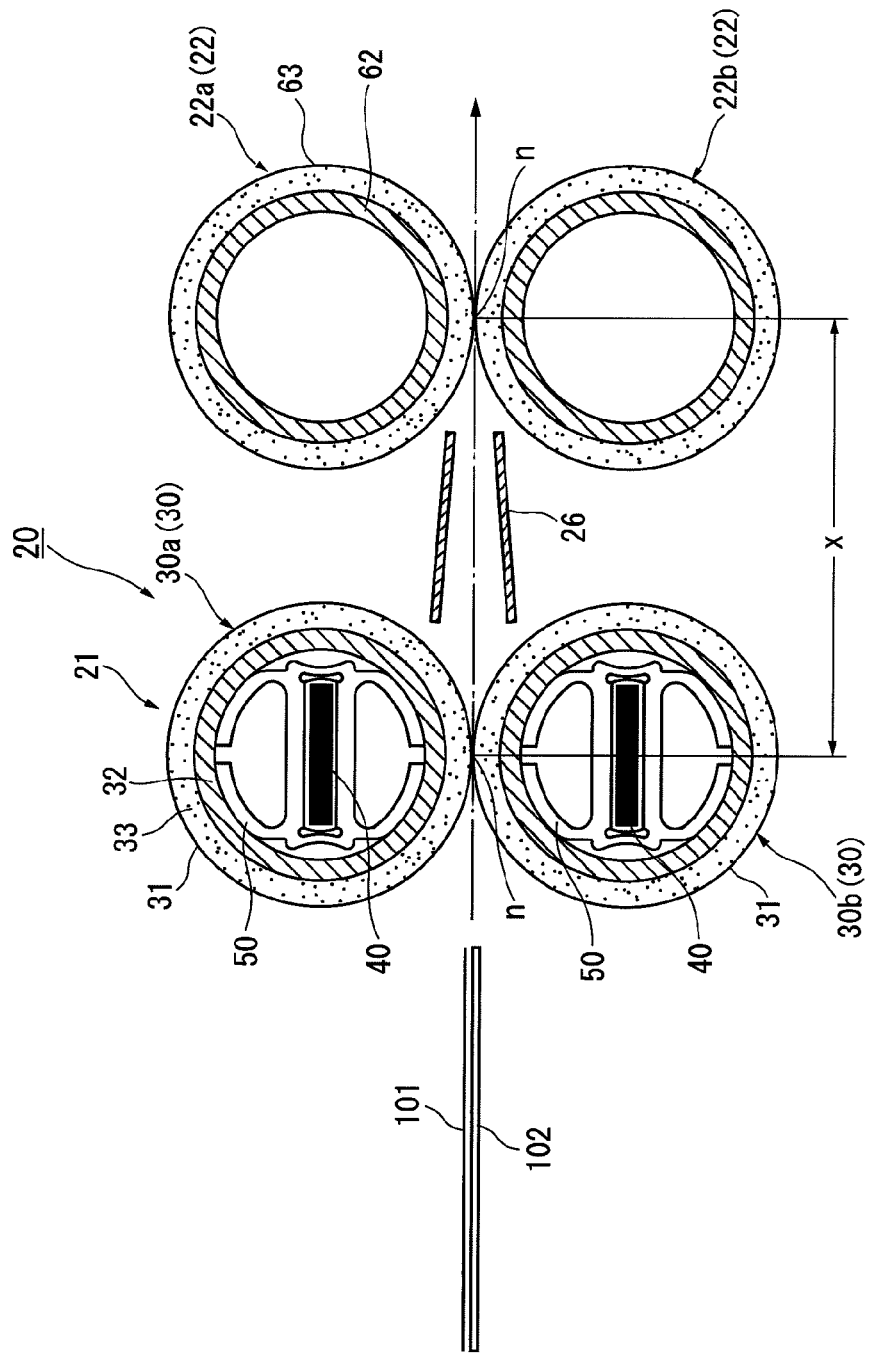
FIG. 3 is a cross-sectional view taken along the line III-III of FIG. 2.

FIG. 2 and FIG. 3 show an embodiment 1 of the laminating device to which this invention is applied.

In the figure, the laminating device 20 comprises a thermal pressure bonding and conveying device 21 that thermally pressure-bonds a laminate film 101 and a sheet 102 while conveying them, stacked together; and a pair of conveying rolls 22 installed downstream of the thermal pressure bonding and conveying device 21 in the sheet conveying direction. The laminating device 20 supports the laminate film and sheet by support side plates 25 of the device frame.

In this embodiment, the thermal pressure bonding and conveying device 21 is constructed of a pair of thermal pressure bonding and conveying rolls 30 (30a, 30b: also referred to simply as bonding rolls).

This paired structure of the bonding rolls 30 has a pair of bond-and-convey rolls 31, both formed hollow and adapted to hold between them the laminate film 101 and the sheet 102 as they are conveyed, heater assemblies 40 incorporated one in each of the bond-and-convey rolls 31, and heat transfer frames 50 to hold the heater assemblies 40 therein and transfer heat from the heater assemblies 40 to the bond-and-convey rolls 31.

<Bond-And-Convey Rolls>

In this embodiment, a pair of bond-and-convey rolls 31, as shown in FIG. 3, has a hollow roll body 32 made of a material with high heat transferability (e.g., aluminum) and an elastic layer 33 (e.g., silicone rubber) covering the surface of the hollow roll body 32. The paired bond-and-convey rolls 31 are pushed against each other by a bias spring not shown to secure a nip area n of a predetermined size between them. In this nip area the laminate film 101 and the sheet 102 are held between the two rolls 31 and conveyed.

<Heater Assembly>

Figure 4:
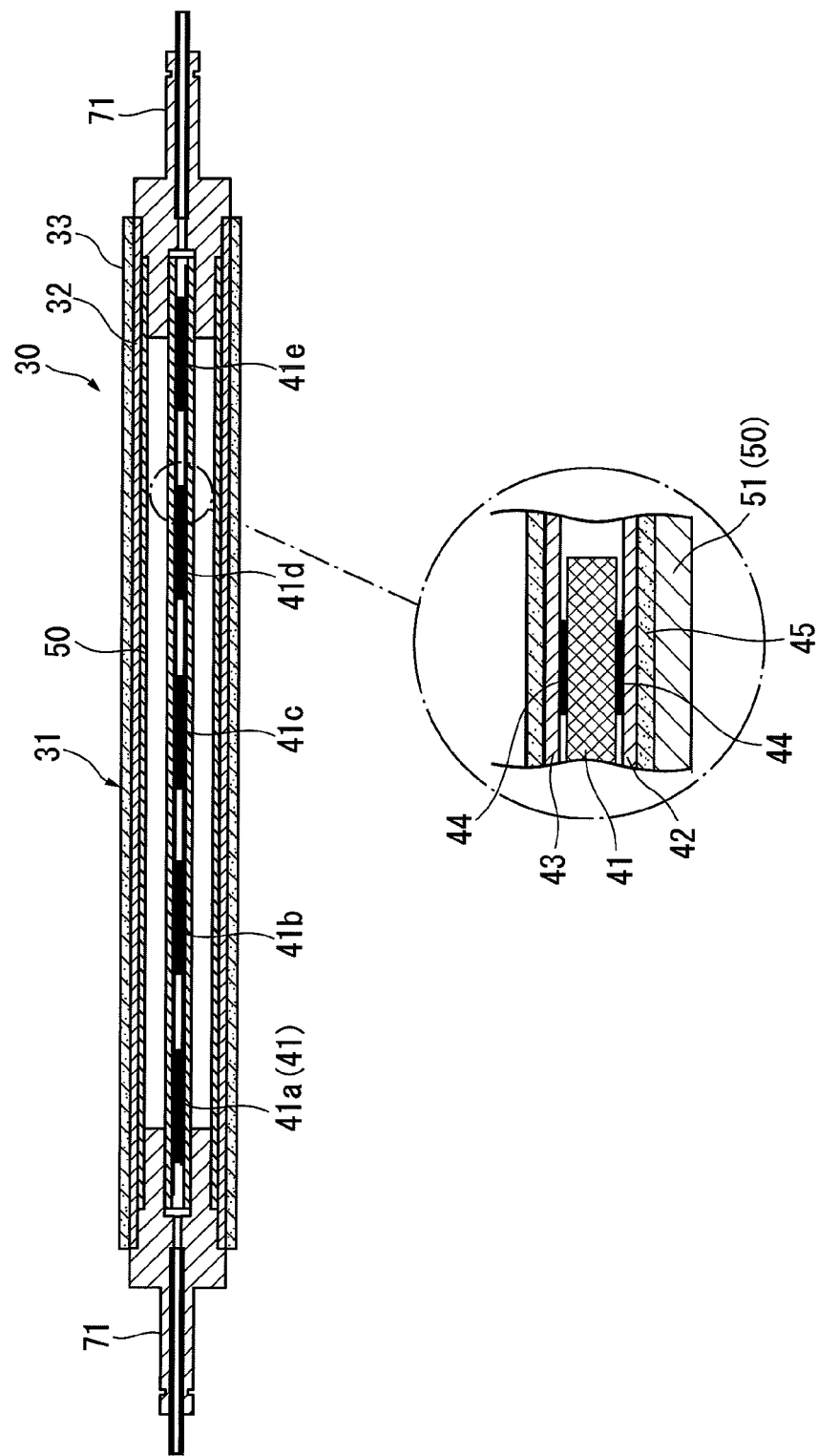
FIG. 4 is an axial cross-sectional view showing essential parts of a thermal pressure bonding and conveying roll used in embodiment 1.
Figure 5A:
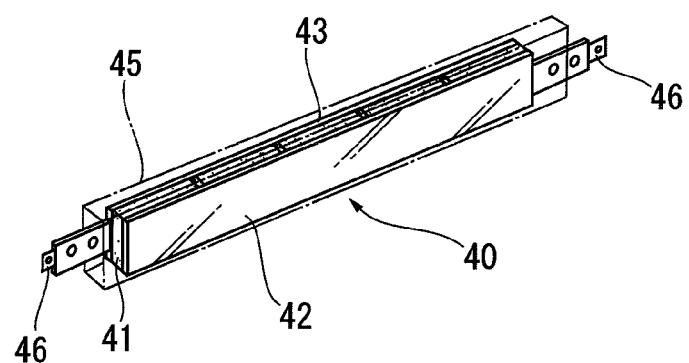
FIG. 5A is a perspective view of a heater assembly used in embodiment 1.
Figure 5B:
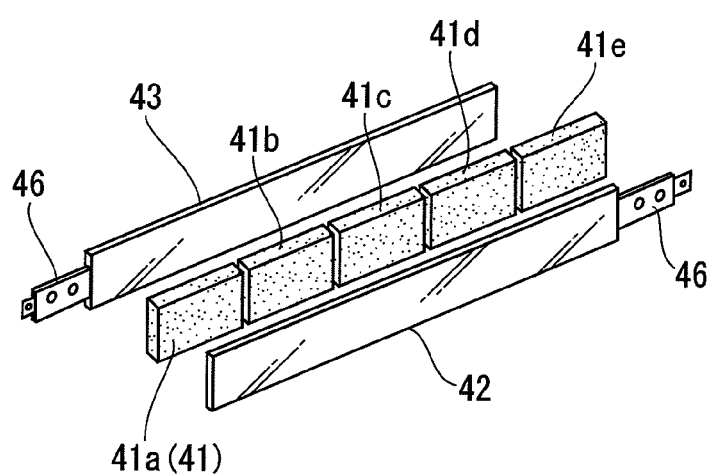
FIG. 5B is an exploded perspective view of essential parts of the heater assembly.

The heater assembly 40, as shown in FIG. 3 through FIG. 5, comprises a plurality of platelike PTC thermistors 41 (e.g., five thermistors 41a to 41e) arrayed in a lengthwise direction and elongate, platelike electrodes 42, 43 attached to the front and back surfaces of the arrayed PTC thermistors 41 through a conductive adhesive layer 44. These members are wholly covered with an insulation cover 45 of, for example, polyimide resin. In FIG. 5, reference numeral 46 denotes a lead-out terminal.

In this embodiment, the insulation cover 45 is intended to prevent an electric current from leaking to the outside when the PTC thermistors 41 (41a-41e) are impressed with voltage. If the insulation cover is formed of a thin film, it is desired that two or more layers of the film be wound around the heater assembly.

<PTC Thermistor Electric Characteristics>

Here, the electric characteristics of the PTC thermistors 41 will be briefly explained.

The PTC thermistor (Positive Temperature Coefficient thermistor) is a semiconductive ceramic composed mainly of barium titanate ($BaTiO_3$), with its Curie temperature being able to be set at any desired value by an appropriate material composition. The PTC thermistor has a characteristic that its electric resistance sharply increases from this temperature.

Figure 6:
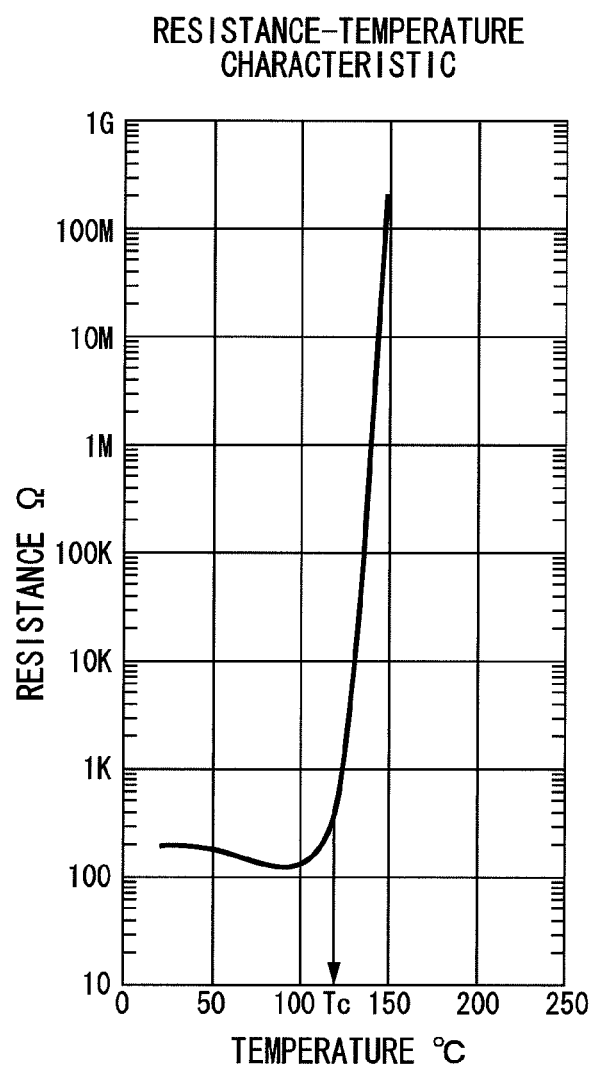
FIG. 6 is a graph showing an example resistance-temperature characteristic of a PTC thermistor used in the heater assembly.

That is, the PTC thermistor 41, when applied with voltage, heats itself by Joule heat and, when its temperature exceeds the Curie temperature Tc, increases its resistance exponentially, as shown in FIG. 6.

The increased resistance reduces current and therefore power, which in turn reduces heat produced, lowering its temperature. When the resistance decreases, current increases, resulting in power increasing again. As a result, the thermistor temperature rises. With this process repeated, the thermistor works as a constant temperature heater with a temperature self-controlling function.

It is noted, however, that since the Curie temperature Tc of the PTC thermistor 41 and the surface temperature of the heater assembly 40 do not always match, it is desired that a check be made in advance to confirm the relation between the Curie temperature Tc of the PTC thermistor 41 and the surface temperature of the heater assembly 40.

<Heat Transfer Frame>

Figure 7A:
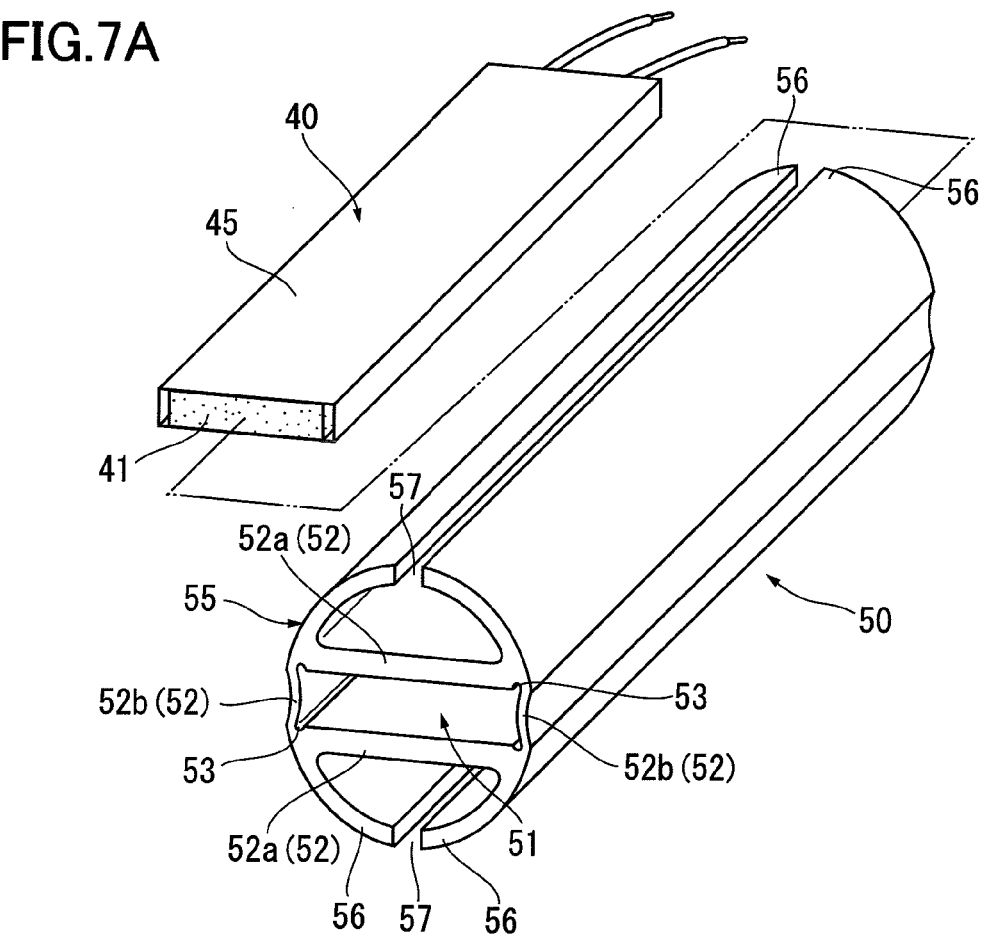
FIG. 7A is an explanatory diagram showing the heater assembly and a heat transfer frame used in embodiment 1.
Figure 7B:
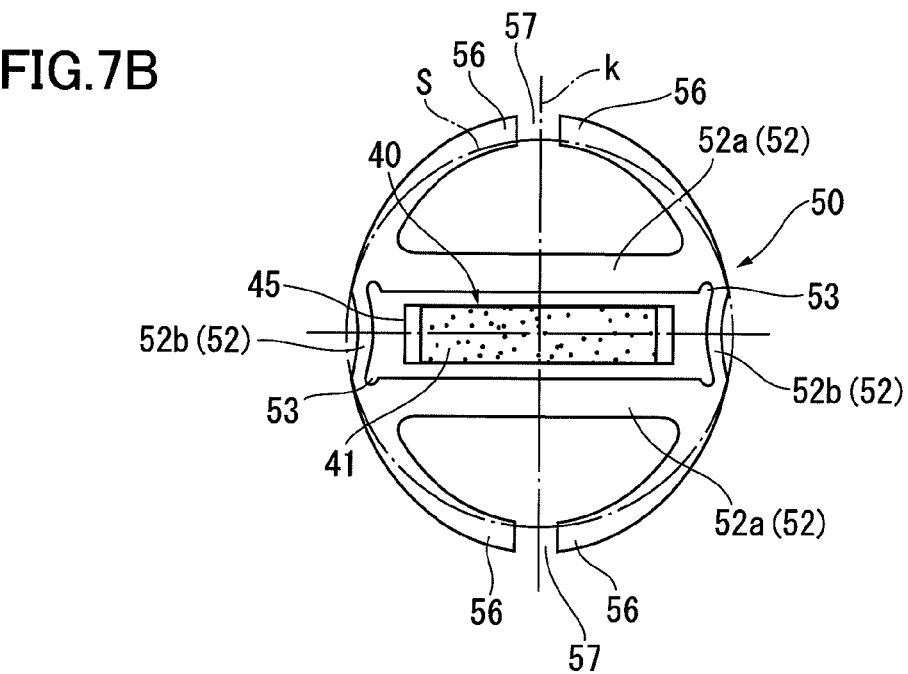
FIG. 7B shows the two parts assembled together.

The heat transfer frame 50, as shown in FIGS. 7A and 7B, has a holding cylinder 51 with a cylindrical space therein, rectangular in cross section, to accommodate the platelike heater assembly 40, and a heat transfer arm 55 formed integral with the holding cylinder 51 to transfer heat from the heater assembly 40 to the bond-and-convey roll 31. The holding cylinder 51 may be extrusion-formed of aluminum with high heat transferability and workability.

Here, the holding cylinder 51 has a circumferential wall 52 defining the cylindrical space almost rectangular in cross section with notches 53 of an almost circular cross section formed at inside corners of the circumferential wall 52. The notches 53 allow the circumferential wall 52 to deform elastically. In this example, in particular, before the heat transfer frame 50 is inserted into the bond-and-convey roll 31, circumferential wall portions 52a facing the front and back surfaces of the heater assembly 40 in the holding cylinder 51 are arranged parallel to each other and circumferential wall portions 52b facing the widthwise surfaces of the heater assembly 40 are slightly curved and opposing each other.

Figure 8:
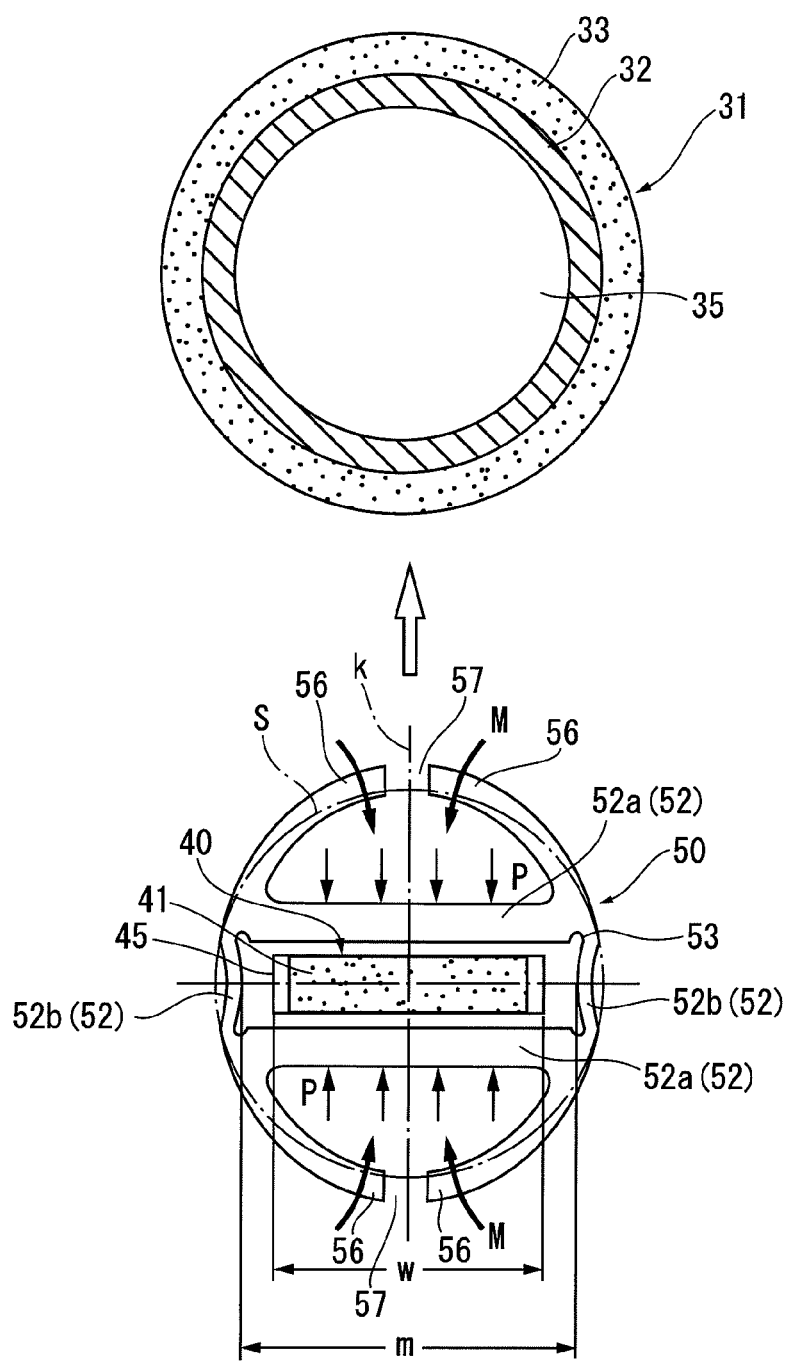
FIG. 8 shows how the heater assembly and a heat transfer frame, both constitutional elements of a thermal pressure bonding and conveying roll used in embodiment 1, are assembled into a bond-and-convey roll.

The heat transfer arm 55 is formed as protruding pieces 56 that elastically deformably protrude outwardly from the outside corners of the circumferential wall 52 of the holding cylinder 51. Before the heat transfer frame 50 is inserted into the bond-and-convey roll 31, the protruding pieces 56 are curved so that in a free state they protrude outside from a circular locus s representing the inner surface of the bond-and-convey roll 31 on the side of a hollow portion 35 (FIG. 8). Between the opposing free ends of the protruding pieces 56 there is provided a gap 57 that allows the protruding pieces 56 to elastically deform along the circular locus s.

In this embodiment, the protruding pieces 56 of the heat transfer arm 55 are arranged line-symmetric with respect to a center line k extending widthwise of the roughly rectangular cross section of the holding cylinder 51 so that the holding cylinder 51 lies line-symmetrically (or point-symmetrically) between the protruding pieces 56.

The heat transfer frame 50, after having the heater assembly 40 inserted into the cylindrical space of its holding cylinder 51 as shown in FIG. 7, is then incorporated into the hollow portion 35 of the bond-and-convey roll 31 as shown in FIG. 8.

At this time, the protruding pieces 56 of the heat transfer arms 55 of the heat transfer frame 50 are elastically deformed in the direction of arrow M along the circular locus s of the hollow portion 35 in the bond-and-convey roll 31 and are kept in contact with the inner surface of the bond-and-convey roll 31 on the hollow portion 35 side.

In this state, as the protruding pieces 56 of the heat transfer arms 55 elastically deform, the circumferential wall portions 52a of the holding cylinder 51 that face the front and back surfaces of the heater assembly 40 are pushed in the direction of arrow P through the notches 53 and elastically deformed to come into hermetic contact with the front and back surfaces of the heater assembly 40.

As for the motion of the other circumferential wall portions 52b of the circumferential wall 52 opposing each other in the widthwise direction of the heater assembly 40, as the protruding pieces 56 of the heat transfer arms 55 elastically deform, the circumferential wall portions 52b are slightly deformed elastically toward the inner surface of the bond-and-convey roll 31 on the hollow portion 35 side through the notches 53.

In that case, since the heater assembly 40 is elastically held by the circumferential wall portions 52a of the holding cylinder 51 of the heat transfer frame 50, there is no possibility of the heater assembly 40 moving undesirably inside the holding cylinder 51. Further, since the circumferential wall portions 52b of the holding cylinder 51 elastically deform away from the side walls of the heater assembly 40, the holding cylinder 51 does not exert an unnecessarily large load on the side walls of the heater assembly 40, eliminating the possibility of damage to the heater assembly 40.

Consider a case where the width of an outer surface cross section of the insulation cover 45 of the heater assembly 40 is set at w and the width of the cylindrical space of the holding cylinder 51 of the heat transfer frame 50 is set at m. If w≈m before the heat transfer frame 50 incorporating the heater assembly 40 is inserted into the bond-and-convey roll 31, since the widthwise side portions of the heater assembly 40 come into contact with the circumferential wall portions 52b of the holding cylinder 51, the heater assembly 40 is positioned symmetrical with respect to a center line k of the heat transfer frame 50.

—Conveying Rolls—

The paired conveying rolls 22 (22a, 22b), as shown in FIG. 2 and FIG. 3, have a hollow roll body 62 of aluminum, for example, coated on its surface with an elastic layer 63 of an elastic material (e.g., silicone rubber). The two conveying rolls are pushed against each other by a bias spring not shown to secure a predetermined nip area n. In this nip area the laminate film 101 and the sheet 102 are held between the two rolls 22 and conveyed.

It is noted that the distance x between the nip area n of the bonding rolls 30 in the thermal pressure bonding and conveying device 21 and the nip area n of the conveying rolls 22 is set shorter than the minimum size of the sheet 102. In a sheet conveying path between the bonding rolls 30 and the conveying rolls 22 is installed a guide member 26 that guides the laminated sheet 102 to the nip area n of the conveying rolls 22.

—Drive System—

Figure 9:
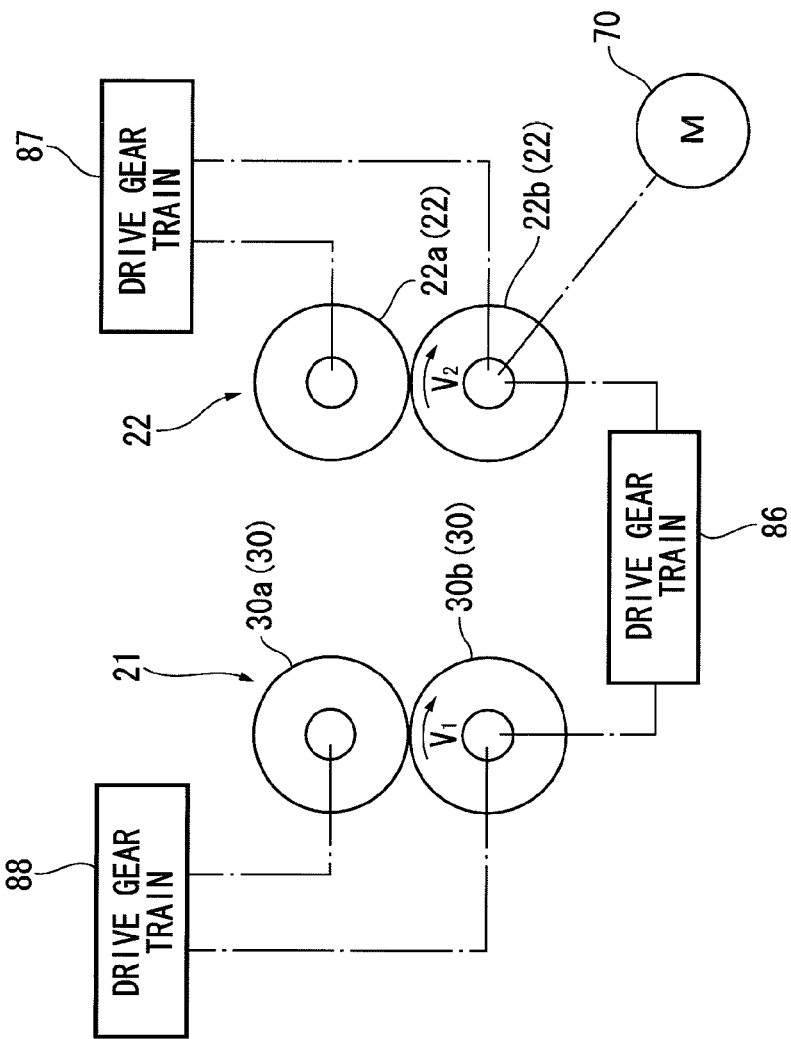
FIG. 9 is a schematic diagram showing a drive force transmission system of the laminating device used in embodiment 1.

In this embodiment, the drive system for the laminating device 20, as shown in FIG. 2 and FIG. 9, directly transmits a drive force from a drive motor 70 to the conveying roll 22b, one of the paired conveying rolls 22, from which the drive force is further transmitted through a drive gear train 86 to the bonding roll 30b, one of the paired bonding rolls 30 in the thermal pressure bonding and conveying device 21. The drive force transmitted to the conveying roll 22b is then transferred to the other conveying roll 22a through a drive gear train 87 installed on the side axially opposite the drive gear train 86. The drive force transmitted to the bonding roll 30b is further transmitted to the other bonding roll 30a through a drive gear train 88 installed on the side axially opposite the drive gear train 86.

In FIG. 9, let the circumferential speed of the bonding rolls 30 be v1 and the circumferential speed of the conveying rolls 22 be v2. The drive force transmission system is adjusted to meet the condition of v2 being slightly greater than v1 so that the laminated sheet 102 that has passed the bonding rolls 30 is pulled by the conveying rolls 22.

—Support Structure Of Bonding Rolls And Their Power Supply—

An example support structure for the bonding rolls 30 of the thermal pressure bonding and conveying device 21 is as follows.

Figure 10:
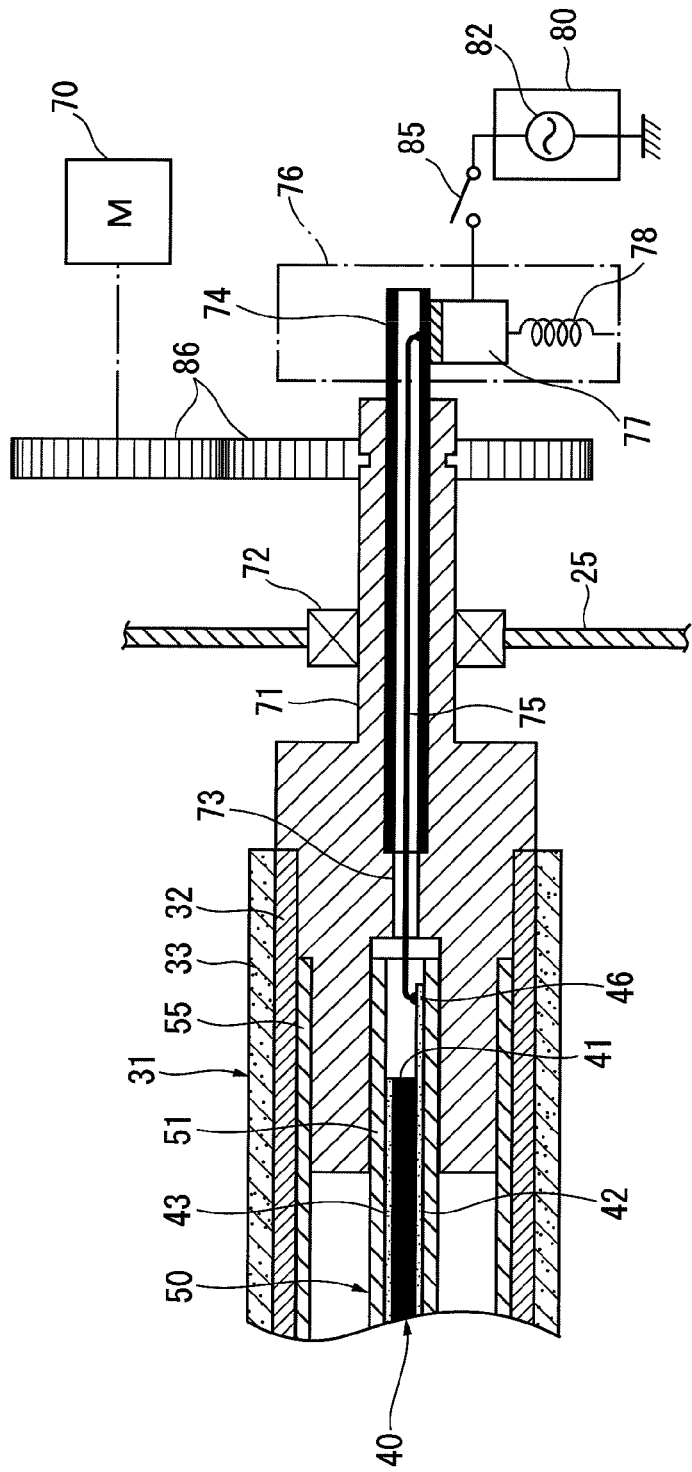
FIG. 10 is an explanatory diagram showing a structure used in embodiment 1 in which the thermal pressure bonding and conveying roll is rotated and in which the heater assembly is supplied with electricity.

As shown in FIG. 2 and FIG. 10, the bond-and-convey roll 31 has its open ends fitted with an insulating support shaft 71 formed of, for example, phenol resin which is supported on a support side plate 25 through a bearing 72.

How the bonding rolls 30 are supplied electricity is explained as follows. The insulating support shaft 71 is formed with an axially extending through-hole 73. At one side of the through-hole 73 is arranged a terminal 46 of the electrode 42 (or 43) of the heater assembly 40 (see FIG. 5). At the other side of the through-hole 73 is installed a conductive pipe 74, which is connected to the terminal 46 through a wire 75. A conductive brush 77 as an electricity supply unit 76 is pressed against one end portion of the conductive pipe 74 by a spring 78. A voltage from a power source 80 (in this example an AC bias from AC power source 82 is used) is applied to the conductive brush 77 through a switch 85. This invention is not limited to the AC bias as the power source 80 and it is also possible to use a DC bias, or an AC bias superimposed with a DC bias.

Next, the operation of the laminating device according to this embodiment will be explained.

Before going into detail, let us explain about the operation of a laminating device taken up for comparison.

Figure 11A:
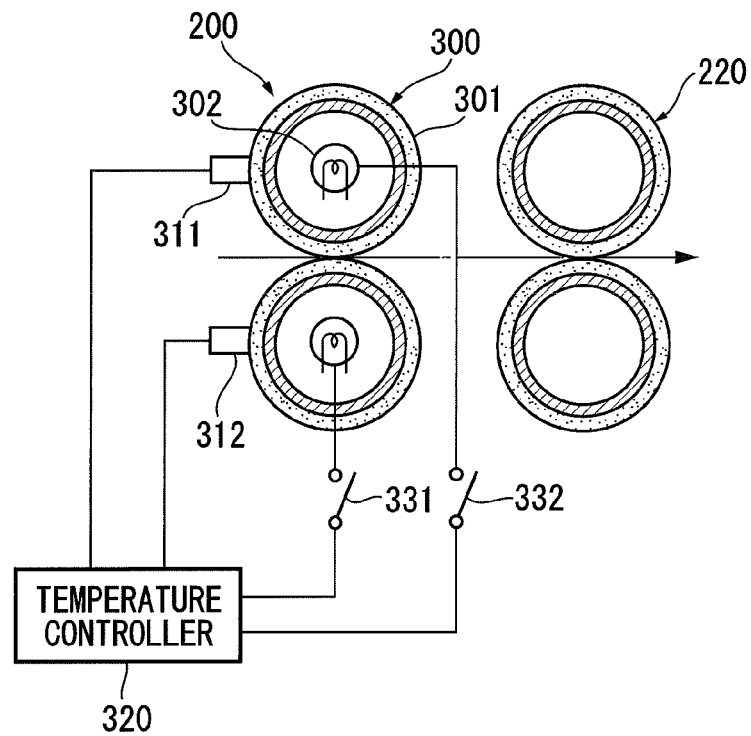
FIG. 11A illustrates a conventional laminating device with its temperature control circuitry, for comparison with the embodiment of this invention.

FIG. 11A shows a comparison example of the laminating device.

In the figure, the laminating device 200 for comparison has paired bonding rolls 300 and paired conveying rolls 220 for pulling and transferring a laminated sheet 102. In the bonding rolls 300 a heat lamp 302 such as halogen lamp is installed as a heat source inside hollow bond-and-convey rolls 301.

Temperature sensors 311, 312 of contact or non-contact type are arranged to oppose the surface of the bonding rolls 300 to detect their surface temperatures. Detected temperature information is taken into a temperature controller 320 which then executes an on-off control on the heat lamp 302 with temperature adjusters 331, 332 such as bimetals.

This comparison example requires the temperature control system (temperature sensors, temperature adjusters and temperature controller) and therefore its construction is complex.

Particularly in a case where contact type temperature sensors are used, since they are in contact with the bonding rolls 300, they are likely to score the bonding rolls 300 and even scrape the laminated sheet.

Further, since the temperature sensors are in contact with the bonding rolls 300 at all times, they are easily deformed or their circuits broken, resulting in a failure.

Moreover, over a long period of use, a hot-melt adhesive of the laminate film may adhere to the temperature sensors, making them unable to perform correct temperature detection.

In a case where non-contact type temperature sensors (e.g., infrared sensors) are used, although the problem posed by the contact type temperature sensors is eliminated, the non-contact type temperature sensors need to be used in combination with amplifiers, raising the cost. Another problem of the non-contact type temperature sensors is that, when particle dust adheres to the detection surface, they cannot detect correct temperatures. As a result, the detected temperatures are likely to shift to higher temperatures than the laminating temperature, degrading the laminating finish. In addition, possible jamming caused by dust may damage the laminated sheet.

Since the heating by the heat lamp 302 is executed through an air layer inside the bonding rolls 300, the rate of temperature rise is slow. A failure of the heat lamp 302 can heat the rolls to excessively high temperatures. So, some measures for such abnormal conditions need to be taken.

Further, since the laminating temperature is adjusted by the temperature adjusters executing an on-off intermittent control, the target laminating temperature can only be reached after an overshoot of the temperature has occurred, taking time before a stable temperature distribution is obtained. There is also a concern about large fluctuations in the heating temperature.

Figure 11B:
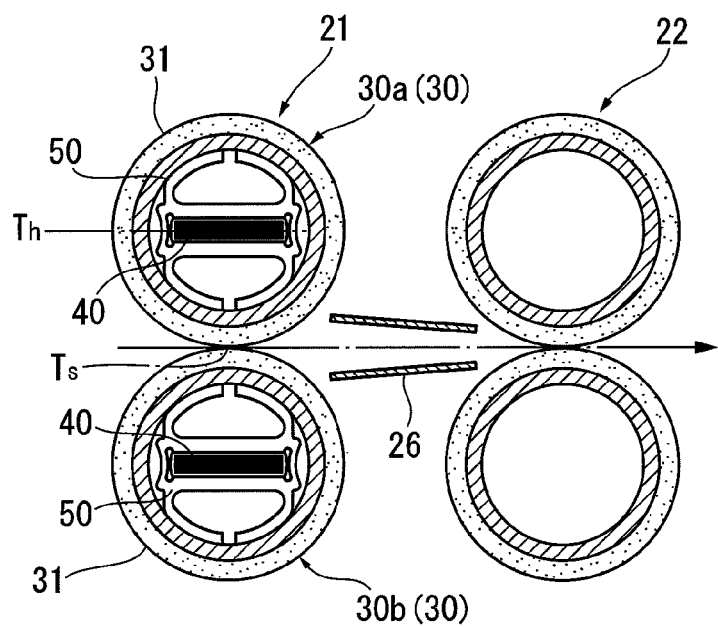
FIG. 11B illustrates the laminating device of embodiment 1 showing how the temperature control is achieved.

In the embodiment of this invention, as shown in FIG. 10 and FIG. 11B, when an operation switch 85 is turned on during the use of the laminating device 20, a voltage of AC bias superimposed with DC current is applied from the power source 80 to the heater assembly 40 through the conductive brush 77 and the conductive pipe 74.

Then, a current flows to the PTC thermistors 41 causing them to heat up. The heat from the heater assembly 40 is transferred efficiently to the bond-and-convey roll 31 mainly through the circumferential wall portions 52a and the heat transfer arms 55 of the holding cylinder 51 of the heat transfer frame 50, both the wall portions 52a and arms 55 being formed of metal with good heat transferability.

At this time, the rate of rise of temperature Th in the heater assembly 40 using the PTC thermistors 41 is fast. When the temperature reaches the Curie temperature Tc, the thermistor resistance instantly becomes high, making it difficult for the current to flow, thereby restraining the heating of the heater assembly 40. As a result, the surface temperature Ts of the bonding rolls 30 stably arrives at the target laminating temperature without overheating.

As described above, this embodiment of the invention can perform the temperature control easily because of the temperature self-controlling function of the heater assembly 40 using the PTC thermistors 41, without having to use the temperature control system (temperature sensors, temperature adjusters and temperature controller) required by the comparison example.

In addition, since the PTC thermistors 41 produce heat over their entire surface, there is no problem of variations in the distribution of heat.

Furthermore, since the temperature of the heater assembly 40 does not rise excessively, there is no need to consider countermeasures against possible abnormal heating of the bonding rolls 30 that are required by the comparison example.

Particularly in the embodiment of the invention, since the paired bonding rolls 30 both have a heat source, this embodiment can be effectively applied to a case where the laminate film 101 is bonded to the front and back surfaces of the sheet 102.

Further, in this embodiment, the heat transfer frame 50 transmits heat to nearly the entire region of the hollow portion 35 of the bond-and-convey rolls 31, so that the surface temperature distribution over the whole circumferential surface of the bonding rolls 30 can be kept almost uniform.

Embodiment 2

Figure 12:
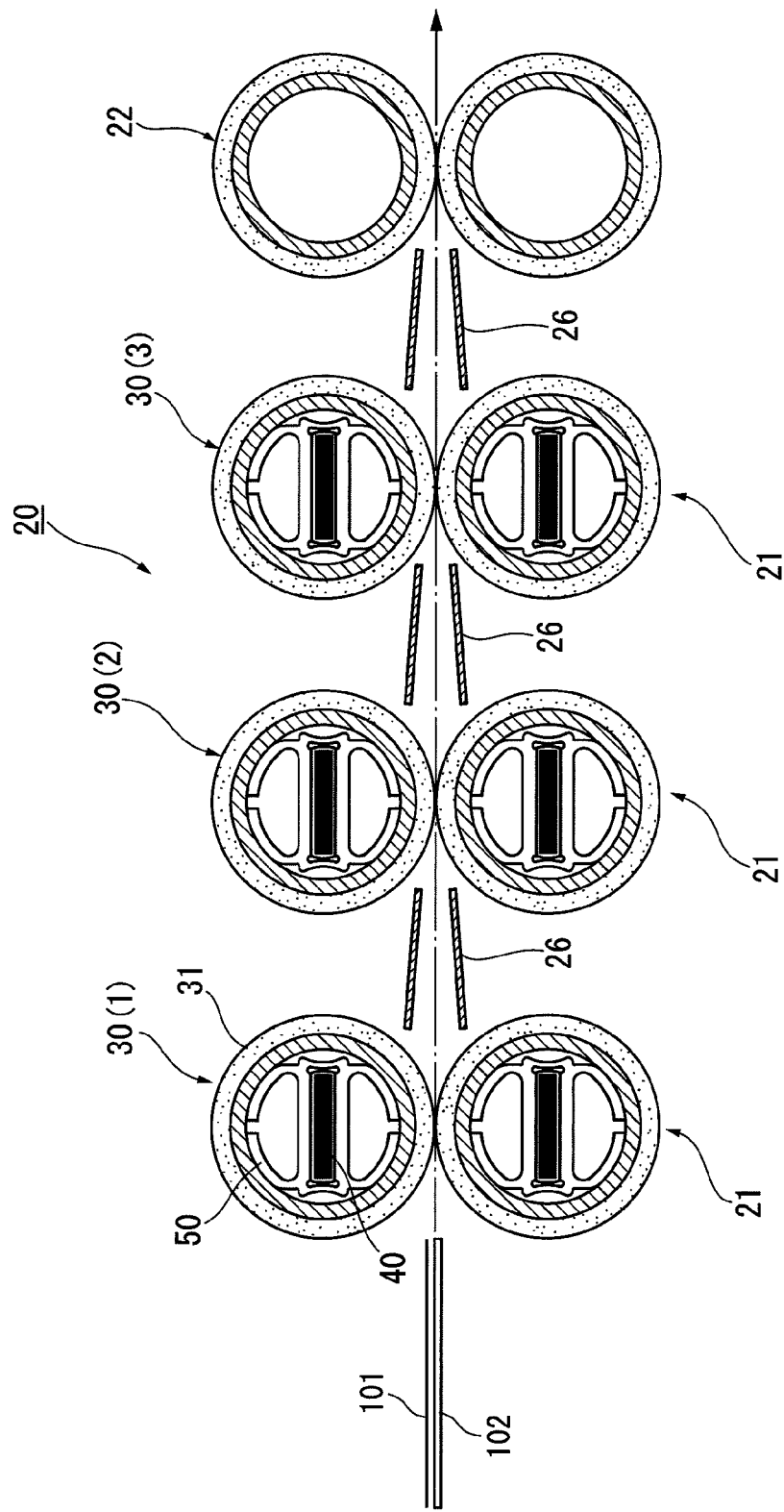
FIG. 12 is an explanatory diagram showing an outline of the laminating device of embodiment 2.

FIG. 12 shows an outline of embodiment 2 of the laminating device applying the present invention.

In the figure, the laminating device 20 comprises a plurality of pairs (in this example, 3 pairs) of bonding rolls 30 (30(1), 30(2), 30(3)) as the thermal pressure bonding and conveying device 21; and a pair of conveying rolls 22 installed downstream of the bonding rolls 30 in the sheet transfer direction to pull and convey the laminated sheet 102.

The individual paired bonding rolls 30 are constructed in the similar manner to the embodiment 1. Between the individual pairs of bonding rolls 30 and between the last pair of bonding rolls 30 and the paired conveying rolls 22 there are installed guide members 26, as necessary, that guide the laminated sheet 102. Constitutional elements that are identical with the corresponding elements of embodiment 1 are given like reference numerals and their detailed explanations are omitted here.

With this embodiment, since a plurality of pairs of bonding rolls 30 are provided, the operation of laminating the laminate film 101 and the sheet 102 can be divided into the same number of operation segments, allowing for a faster lamination.

Embodiment 3

Figure 13:
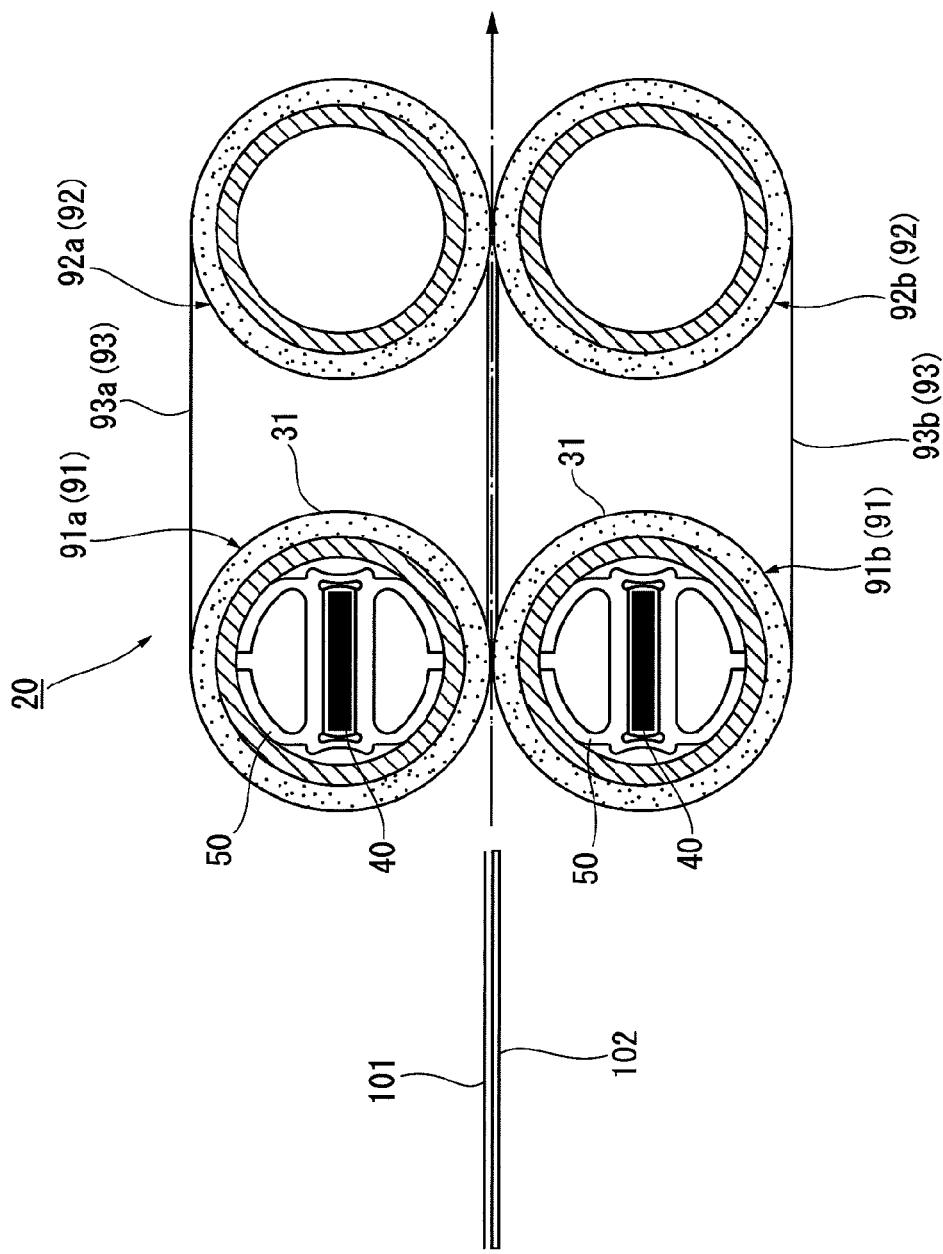
FIG. 13 is an explanatory diagram showing an outline of the laminating device of embodiment 3.

FIG. 13 shows an outline of embodiment 3 of the laminating device applying the present invention.

In the figure, unlike embodiment 1 and 2, the laminating device 20 comprises a pair of upstream bond-and-convey rolls 91 (91a, 91b), formed hollow, to grip and convey the laminate film 101 and the sheet 102; a pair of downstream bond-and-convey rolls 92 (92a, 92b), also formed hollow and installed downstream of the upstream bond-and-convey rolls 91, to grip and convey the laminate film 101 and the sheet 102; and belt members 93 (93a, 93b) of polyimide, each stretched between the upstream and downstream bond-and-convey rolls 91 and 92, with the heater assembly 40 installed in each of the paired upstream bond-and-convey rolls 91.

In this embodiment, the upstream bond-and-convey rolls 91 practically work as the bonding rolls 30 of embodiment 2. The laminated sheet 102 that has passed the upstream bond-and-convey rolls 91 is transported, held between the two belt members 93 (93a, 93b), and then passes the downstream bond-and-convey rolls 92 before being discharged.

At this time, the laminating operation by the upstream bond-and-convey rolls 91 is properly performed in the similar way to embodiment 1.

The invention claimed is:
1. A laminating device for stacking and bonding a laminate film coated with a hot-melt adhesive and a sheet, comprising:
a thermal pressure bonding and conveying device to thermally pressure-bond at least the laminate film and the sheet while stacking and conveying them;

wherein the thermal pressure bonding and conveying device comprises:
- a pair of bond-and-convey members, at least one of them formed as a hollow roll, to grip and convey the laminate film and the sheet;
- a platelike heating member having a platelike PTC thermistor and placed in at least one of the paired bond-and-convey members which is formed as a hollow roll; and
- a heat transfer frame placed inside and in contact with the hollow roll-shaped bond-and-convey member to rotate with the hollow roll-shaped bond and convey member, holding the platelike heating member therein and being able to transfer heat from the platelike heating member to the hollow roll-shaped bond-and-convey member.

2. The laminating device according to claim 1, wherein the heat transfer frame comprises:
- a holding cylinder having a cylindrical space almost rectangular in cross section in which to accommodate the platelike heating member, the holding cylinder being so constructed that at least circumferential wall portions thereof facing front and back surfaces of the platelike heating member can resiliently deform; and
- heat transfer arms resiliently deformably protruding outwardly from parts of the resiliently deformable circumferential wall portions of the holding cylinder, the heat transfer arms being elastically deformed and placed in contact with an inner surface of the hollow roll-shaped bond-and-convey member;
- wherein, as a result of the elastic deformation of the heat transfer arms, the elastically deformable circumferential wall portions of the holding cylinder are brought into hermetic contact with the front and back surfaces of the platelike heating member.

3. The laminating device according to claim 2, wherein the heat transfer arms of the heat transfer frame are provided at corners of the almost rectangular cross section of the holding cylinder and arranged, line-symmetrically with respect to a center line extending widthwise of the rectangular cross section of the holding cylinder.

4. The laminating device according to claim 2, wherein the heat transfer arms are arranged, line-symmetrically or point-symmetrically, with respect to the holding cylinder positioned between them.

5. The laminating device according to claim 2, wherein the holding cylinder of the heat transfer frame has its side wall portions, opposing each other widthwise of the rectangular cross section, elastically deform as the heat transfer arms are elastically deformed;
- wherein, before the heat transfer arms are deformed and placed in contact with the inner surface of the hollow roll-shaped bond-and-convey member, the side wall portions of the holding cylinder are in contact with widthwise-opposing side portions of the platelike heating member.

6. The laminating device according to claim 1, wherein the thermal pressure bonding and conveying device has both of the paired bond-and-convey members formed as hollow rolls;
- wherein the platelike heating member is held in at least one of the bond-and-convey members through the heat transfer frame.

7. The laminating device according to claim 1, further comprising:
- a pair of conveying members installed downstream of the thermal pressure bonding and conveying device to pull and convey the sheet laminated with the laminate film that has passed the thermal pressure bonding and conveying device.

8. The laminating device according to claim 1, wherein the thermal pressure bonding and conveying device comprises:
- a pair of upstream bond-and-convey members, both formed like rolls and at least one of them formed as a hollow roll, to grip and convey the laminate film and the sheet;
- a pair of downstream bond-and-convey members, both formed like rolls, installed downstream of the upstream bond-and-convey members and adapted to grip and convey the laminate film and the sheet; and
- belt members each stretched between the paired upstream bond-and-convey members and the paired downstream bond-and-convey members;
- wherein the platelike heating member is held, through the heat transfer frame, in at least one of the upstream bond-and-convey members which is formed as the hollow roll.

9. A thermal pressure bonding and conveying device used in a laminating device to bond at least a laminate film coated with a hot-melt adhesive and a sheet under pressure and heat by stacking and conveying them, the thermal pressure bonding and conveying device comprising:
- a pair of bond-and-convey members, at least one of them formed as a hollow roll and adapted to grip and convey the laminate film and the sheet in a predetermined nip area;
- a platelike heating member having a platelike PTC thermistor and placed in at least one of the paired bond-and-convey members which is formed as a hollow roll; and
- a heat transfer frame placed inside and in contact with the hollow roll-shaped bond-and-convey member to rotate with the hollow roll-shaped bond and convey member, holding the platelike heating member therein and being able to transfer heat from the platelike heating member to the hollow roll-shaped bond-and-convey member.

10. A laminating device for stacking and bonding a laminate film coated with a hot-melt adhesive and a sheet, which includes:
- a thermal pressure bonding and conveying device for thermally pressure bonding at least the laminate film and the sheet while stacking and conveying them, said thermal pressure bonding and conveying device comprising;
- a pair of bond-and-convey members which define a laminating zone therebetween, at least one of the bond-and-convey members being formed as a hollow roll to grip and convey the laminate film and the sheet, and
- a heating member disposed within at least one of said pair of bond-and-convey members and spaced apart from said laminating zone, said heating member being disposed within a heat transfer frame which is placed in contact with the at least one bond-and-convey member for transferring heat from the heating member to the bond-and-convey member through said heat transfer frame, wherein the heat transfer frame defines a holding cylinder having circumferential wall portions thereof facing front and back surfaces of the heating member, which can resiliently deform, and heat-transfer arms resiliently and deformably protruding outwardly from parts of the resiliently deformable circumferential wall portions of the holding cylinder, the heat transfer arms being elastically deformed and placed into contact with the inner surface of the hollow roll-shaped bond-and-convey member, whereby, as a result of the elastic deformation of the heat transfer arms, the elastic deformable circumferential wall portions of the holding cylinder are brought into hermetic contact with the front and back surfaces of the heating member.

11. The laminating device of claim 10, wherein the heating member, which is disposed within the heat-transfer frame, is centrally disposed within at least one of said pair of bond-and-convey members and the deformable heat-transfer arms elastically extend from the heat transfer frame of the holding cylinder to circumferentially engage the walls of the bond-and-convey members.

\* \* \* \* \*